(12) United States Patent
John

(10) Patent No.: US 7,217,180 B2
(45) Date of Patent: May 15, 2007

(54) DIAMOND TAPE COATING AND METHODS OF MAKING AND USING SAME

(75) Inventor: Hendrik John, Celle (DE)

(73) Assignee: Baker Hughes Incorporated, Houston, TX (US)

( * ) Notice: Subject to any disclaimer, the term of this patent is extended or adjusted under 35 U.S.C. 154(b) by 287 days.

(21) Appl. No.: 10/369,007

(22) Filed: Feb. 19, 2003

(65) Prior Publication Data

US 2004/0162014 A1 Aug. 19, 2004

(51) Int. Cl.
B24B 7/00 (2006.01)
(52) U.S. Cl. .......................... 451/541; 51/309; 451/540
(58) Field of Classification Search ................ 451/540, 451/541; 51/307, 309
See application file for complete search history.

(56) References Cited

U.S. PATENT DOCUMENTS

| | | | | |
|---|---|---|---|---|
| 5,379,853 A * | 1/1995 | Lockwood et al. | ......... | 175/428 |
| 5,855,997 A * | 1/1999 | Amateau | ................ | 428/212 |
| 6,669,745 B2 * | 12/2003 | Prichard et al. | ............. | 51/297 |
| 2002/0077054 A1 | 6/2002 | Sung | | |
| 2003/0209534 A1 * | 11/2003 | Ferguson | .................... | 219/548 |
| 2004/0112359 A1 * | 6/2004 | Sung | ........................ | 125/15 |

FOREIGN PATENT DOCUMENTS

EP 0 134 709 B1 4/1988

OTHER PUBLICATIONS

Andreas Roosen, "Basic Requirements for Tape Casting of Ceramic Powders," *Ceramic Transactions*, vol. 1, Part B, Ceramic Powder Science (1988).

* cited by examiner

*Primary Examiner*—Timothy V. Eley
(74) *Attorney, Agent, or Firm*—Madan, Mossman & Sriram, P.C.

(57) ABSTRACT

A method of forming and applying a diamond coating or other superhard coating to a tool, most preferably a downhole tool, such as a drill bit. A superhard powder is placed into slurry and then formed, preferably using a tape casting method, into a green tape that is capable of being handled and applied to a substrate. The tape is then applied to a desired surface on a part or tool, being affixed initially thereto by a suitable braze. The tape is then cured to the surface using a thermal cycle that transforms the tape into a solid diamond composite coating. In another aspect, diamond tape is combined with ceramic tape having electronic circuitry components integrated therein.

12 Claims, 2 Drawing Sheets

DIAMOND TAPE COATING AND METHODS OF MAKING AND USING SAME

BACKGROUND OF THE INVENTION

1. Field of the Invention

The invention relates generally to the formation of diamond coatings and their application to drilling bits and other drilling tools. In particular aspects, the invention relates to techniques for preparing and applying such coatings using a tape casting procedure.

2. Description of the Related Art

Drilling tools, including bits, are typically formed of a steel core that is enclosed in a tungsten carbide shell. Hardfacing may be applied to portions of the outer surface of the bit or tool. Polycrystalline diamond (PCD) is used to protect those portions of a drill bit or other drilling tools that are subjected to the most extreme wear forces during drilling. Conventionally, PCD inserts are incorporated into the surface of the tool. Alternatively, diamond grit may be incorporated into the surface. In these instances, the diamond coatings or inserts are often prone to removal from the substrate during use within the borehole. A further problem associated with these techniques is the distribution of the diamond particles. Too few diamond particles concentrated in one area will lead to points of weakness and wear during intensive and sustained use within a borehole.

Traditionally, when small superhard particles are used to coat a substrate, they are first mixed into with a metal bonding matrix that might consist of cobalt powder or powder of another metal. This mixture is then sintered to consolidate it, and the consolidated mixture is applied to the substrate. This technique has a number of problems. First, the consolidated mixture must be maintained at a relatively high temperature during application to the substrate. This requirement adds a level of difficulty in handling during application to the substrate. Additionally, the viscous and non-uniform nature of the metal bonding matrix makes it difficult to achieve a uniform distribution of the superhard particles within the consolidated mixture.

U.S. patent application Publication No. 2002/0077054 A1 by Sung describes a method of applying a diamond coating to tools, such as diamond saws and the like. In the described method, diamond particles are disposed into a sheet of matrix support material. To accomplish this, a sheet of matrix support material is first formed from conventional powders, such as cobalt, nickel, iron, copper, bronze, or other suitable bonding agents. To form the sheet, a matrix powder is mixed with a binder to form a slurry. The slurry is poured onto a plastic tape and pulled underneath a blade or leveling device. The slurry is then cast into a plate with a desired thickness by adjusting the gap between the tape. Thus, while a tape casting method is employed, it is only utilized to create a thin film of binder material. Following this casting and formation process superhard inserts, or particles, are placed into the binder tape by disposing a template with many apertures over the already-cast tape of binder. The superhard particles are then spread over the template and into many of the apertures. Those particles that do not enter one of the apertures are then swept off of the template with a broom or the like. Those particles that are not swept away from the template are then pressed into the binder tape using a flat steel seating plate to seat the particles.

There are a number of weaknesses and drawbacks to Sung's method. First, even if done very carefully, the step of brushing unseated particles away from the template may move, or actually remove, some of the particles that are seated within apertures in the template. Additionally, some of the superhard particles may adhere to the template or to the seating plate rather than being pressed into the binder tape. As a result of these problems, there will inherently be gaps and weaknesses in the resulting coating.

Tape casting is a process that has been used for the creation of generally thin films and sheets, including ceramic substrates for capacitors, sensors, catalysts, and heat exchangers. Examples of conventional tape casting methods are found in Andreas Roosen, "Basic Requirements for Tape Casting of Ceramic Powders," Ceramic Transactions, Volume 1, Part B, Ceramic Powder Science, The American Ceramic Society, Inc. (1988). Typically in tape casting, a very thin tape is created and then dried immediately to evaporate solvents within the tape. The resulting tape may then be cut, punched, or scored, as required by its end use. To the inventors' knowledge, tape casting has not heretofore been utilized for the creation of diamond-based coatings or films.

Additionally, there are methods known for creating ceramic tapes and applying printed circuitry, including capacitors, electrodes, and other conductive components, thereupon. Printed circuitry tapes of this type are used, for example, in creating an oxygen sensor for use in the automotive industry, and other relatively light duty applications. A method for creating such a sensor is described in European Patent No. EP 0 134 709 B1 entitled "An Oxygen Sensor Element." Printed circuitry tapes are generally considered unsuitable for use upon the surfaces of downhole tools, such as drill bits and bottom hole assemblies, since there are not effective means for protecting the circuitry from being scraped off or being otherwise damaged by physical wellbore hazards or being quickly degraded by high temperatures and chemical hazards. A further obstacle to the potential use of printed circuitry tapes with downhole tools is the lack of adequate heat sinks that can be readily incorporated into the structure.

An improved method of effectively forming and applying diamond-based coatings would be desirable. Additionally, improved methods and systems for incorporating diamond-based coatings into coatings having layers of preprinted circuitry therein would be desirable.

SUMMARY OF THE INVENTION

The invention relates to a method of forming and applying a diamond coating to a tool, most preferably a downhole tool, such as a drill bit. In accordance with the most currently preferred embodiment of the invention, a process is used to formulate a diamond coating from a diamond powder. The powder is placed into slurry and then formed, using a tape casting method, into a green tape that is capable of being handled and applied to a substrate. The tape is then applied to a desired surface on a part or tool, being affixed initially thereto by a suitable braze. The tape is then cured to the surface using a thermal cycle that transforms the tape into a solid diamond composite coating. The part or tool may then be cooled down and finished.

In a further aspect of the invention, a diamond tape, or tapes, may be stacked together with other ceramic tapes having printed circuitry thereupon, thereby permitting sensors, actuators, capacitors, or other similar electronic mechanisms to be integrated onto the surface of the downhole tool. Alternatively, circuitry may be printed directly onto the diamond tape itself, as might be desirable for use with an erosion sensor. The printed circuitry is typically applied directly onto the outer diameter of the downhole tool or recesses on the outer diameter. For protection purposes, a diamond tape layer is placed upon the outside of the layer having printed circuitry thereon. For applications wherein a significant heat sink is required for the printed circuitry, it is desirable to place a layer of diamond tape between the printed circuitry and the tool since the diamond material provides an excellent heat conductor and a good heat sink.

BRIEF DESCRIPTION OF THE DRAWINGS

The advantages and further aspects of the invention will be readily appreciated by those of ordinary skill in the art as the same becomes better understood by reference to the following detailed description when considered in conjunction with the accompanying drawings in which like reference characters designate like or similar elements throughout the several figures of the drawing and wherein.

DETAILED DESCRIPTION OF THE PREFERRED EMBODIMENTS

The invention provides improved methods and processes for forming a diamond coating to a surface or substrate such as the cutting surface of a drill bit or other downhole tool. The resulting coating provides a substantially uniform distribution for the diamond particles entrained therein. In addition, the coating has a substantially uniform thickness so that areas of weakness within the coating are minimized.

Figure 1:
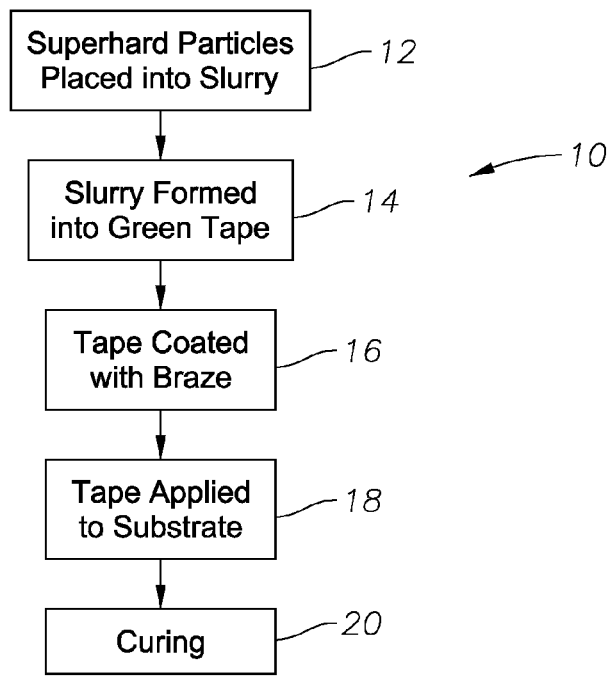
FIG. 1 is a process diagram depicting steps in a method of forming and applying a diamond coating in accordance with the present invention.

FIG. 1 illustrates, in schematic fashion, steps in an exemplary method or process 10 for forming a diamond coating. First, in step 12, a powder of superhard particles is placed into a ceramic slurry. The superhard particles preferably comprise particles of synthetic or natural diamond powder or PCD particles, hereinafter referred to as diamond, but may also comprise particles of cubic boron nitride (CBN) or other superhard materials that are now known or that might be developed hereinafter. The powder of superhard particles has a particle size that is preferably in the range of approximately 5 μm or smaller (i.e., within the sub-micron range).

The superhard powder is mixed with either water to form a ceramic slurry having an aqueous-based solvent, or an organic solvent. Either type of ceramic slurry may also contain organic binders, reactive bonding material, and rheological additives.

An exemplary ceramic slurry containing organic solvent would typically includes either ethanol or trichlorethylene for solvent, polyvinylbutyral as a binder, menhaden fishoil as a dispersant, and either dioctylphthalate or polyethylene glycol as a plasticiser. An exemplary solvent-based slurry would consist of the following percentages (by weight):

| | |
|---|---|
| Diamond powder: | 55% |
| Braze Powder: | 5% |
| Trichlorethylene | 23% |
| Ethanol | 8.9% |
| Menhaden fishoil | 1.0% |
| Dioctylphthalate | 2.1% |
| Polyethylene Glycol | 2.5% |

Ceramic slurries having an aqueous-based solvent system will typically include water as a solvent, acryl polymer emulsion as a binder, acryl sulfonic acid as a dispersant, and polyethylene glycol of butyl benzyl phthalate as a plasticizer.

It is currently preferred that superhard material make up a majority of the content by weight of a ceramic slurry formed in accordance with the present invention. For an organic solvent-based slurry, the typical content of superhard material is from 55-60% by weight with the remaining percentage of material being made up essentially of organic solvents, organic binders, reactive bonding materials, and/or Theological additives, such as wetting agents and defoamers of a type known in the art. For an aqueous-based slurry, the typical content of superhard material is approximately 67%, with the balance of material being made up essentially of water, organic binders, reactive bonding materials, and/or rheological additives, such as wetting agents and defoamers of a type known in the art.

Figure 2:
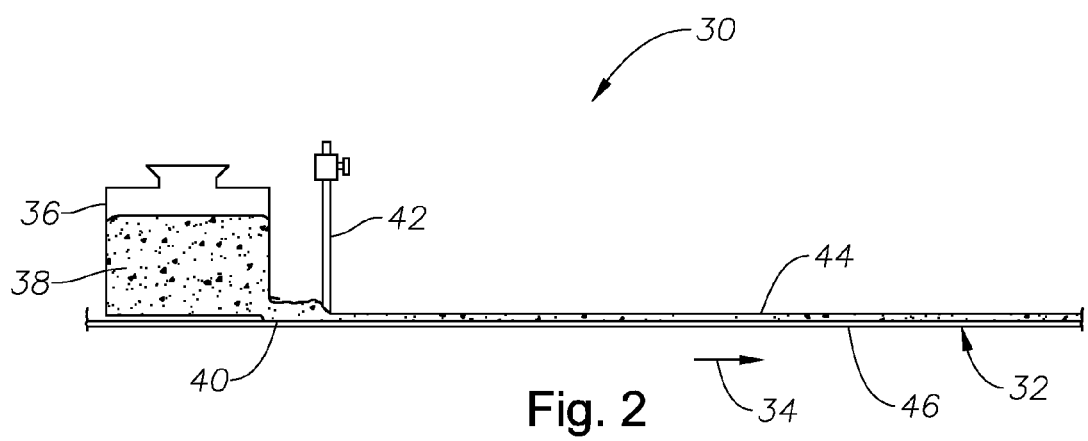
FIG. 2 illustrates an exemplary tape casting process for the formation of a green tape.

In the next step of the process 10, indicated as step 14 in FIG. 1, the slurry is transformed into a "green" tape of diamond or other superhard material. The term "diamond tape," as used herein, should be understood to refer to a tape that includes particles of PCD diamond or other superhard particles, such as CBN. A tape casting process is preferably used to produce a flexible "green" tape from the slurry. A suitable tape casting process will provide a green diamond tape that has a substantially uniform thickness and a substantially uniform distribution of superhard particles therein. FIG. 2 illustrates, again in schematic fashion, an exemplary apparatus 30 for creation of a green tape using a tape casting process. The apparatus 30 includes a flat carrier surface 32 that moves in the direction indicated by the arrow 34. A slurry tank 36 holds an amount of the slurry 38 having superhard particles therein. The slurry 38 is then spread upon an upstream portion 40 of the carrier surface 32. A doctor blade 42 is disposed a set distance above the carrier surface 32 that corresponds closely to the thickness that is desired for a fabricated green tape. The resulting green tape 44 is shown as having been formed upon the downstream portion 46 of the carrier surface 42 due to shaping by the blade 42. The currently preferred thickness for the resulting green diamond tape 44 is in the range of about 0.2 mm to about 1.0 mm. In the "green" form, the tape 44 is flexible and strong enough to be handled and applied to a substrate.

The green diamond tape 44 is then applied to a substrate, such as a surface on a drill bit or other tool, in order to provide a protective, superhard layer for the tool. To apply the tape, one side of the tape is preferably first coated with a metallic braze (see step 16 in FIG. 1). The coated green tape is then applied to the substrate (step 18 ). The braze is a braze material that includes Group 1b-based brazes (i.e., copper, silver, gold). The braze may also constitute a braze having an alloy base, including copper-manganese, tin-sliver, aluminum-silicon, silicon, silicates, and nickel-chrome-boron-silicon-iron alloys. The brazing alloys typically have additions of Ti, Zr, Ta, Cr, or other carbide formers (or mixtures) percentages of about 2% to about 5% by weight. The braze may be applied to the green tape 44 by spraying, painting, screen printing, physical vapor deposition, or other physical, chemical or electrochemical methods.

The coated portion of the tool is subjected to a thermal cycle to cure the tape (step 20 in FIG. 1) and transform it into a solid diamond composite coating. The coated portion of the tool is placed in a vacuum furnace that may be either a radiation or induction type furnace of types known in the art. The tool is first heated to a temperature of about 600° C. to remove the organic binder from the diamond tape. The temperature is then raised to a final temperature that is in the range of about 700° C. to about 1100° C. At or near this final temperature, the reactive bonding agent in the diamond tape establishes a bond between the diamond particles in the tape and the substrate material. Thus, the thermal cycle includes a binder burnout portion, wherein the binder materials within the green tape are removed, and a consolidation portion, wherein the green tape 44 is consolidated through sintering. The binder burnout and consolidation portions of the thermal cycle are usually accomplished in a single heating cycle without cooling down of the coated portion of the tool between portions. The length of time for the binder burnout portion depends upon the binder type, the oven atmosphere, tool geometry and other parameters.

The coated drill bit or other tool or product is then cooled down to about room temperature and may then be finished by grinding, using finishing techniques known in the art.

Figure 3:
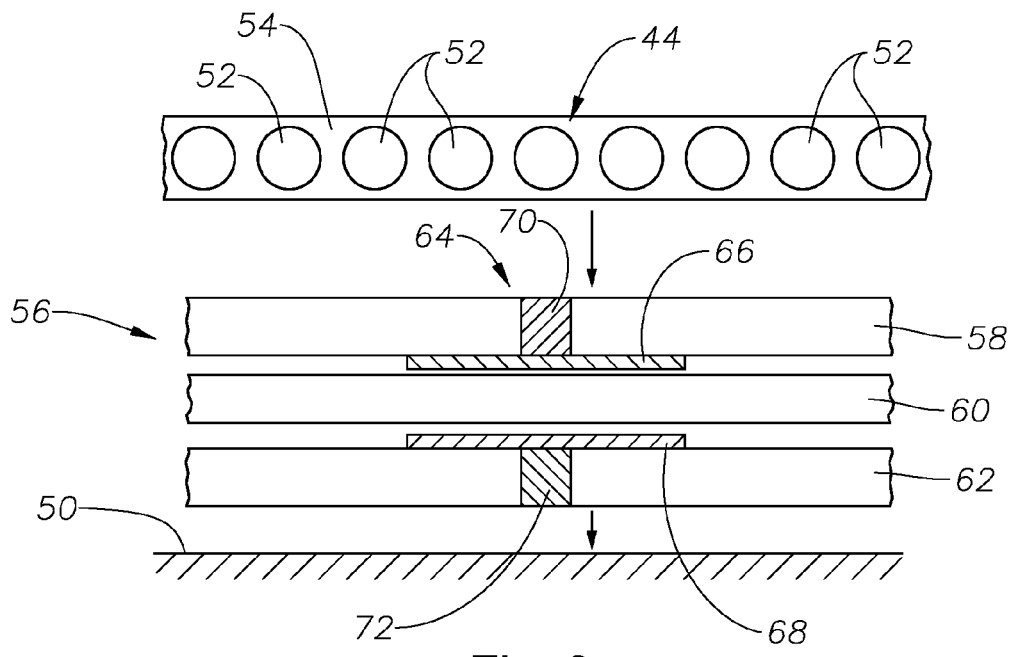
FIG. 3 illustrates a process for incorporating electronic circuit components into a tape.

FIG. 3 illustrates a further aspect of the invention wherein electronic components are integrated into a coated portion of a tool. An uncoated tool surface is shown at 50, and the green diamond tape 44 is shown in cross-section, illustrating superhard particles 52 surrounded by binder 54. A ceramic tape 56 containing capacitor circuitry is shown in between the tool surface 50 and the green diamond tape 44. The ceramic tape 56 is made up of three ceramic layers 58, 60, 62 which are shown separately in FIG. 3 but which, in fact, are laminated to one another to form a single tape 56. The tape 56 is shown to include a capacitor, indicated generally at 64, that is made up of a printed electrode 66 on the upper ceramic layer 58, a printed electrode 68 on the lower ceramic layer 62 and a pair of vias 70, 72, each of the vias 70 or 72 being electrically associated with one of the electrodes 66, 68. These circuit components are integrated into the ceramic layers 58, 60, 62 using Low Temperature Co-Fired Ceramic (LTCC) tape techniques, which are known in the art and described, for example in European Patent No. EP 0 134 709 B1 entitled "An oxygen sensor element." A typical LTCC tape is formed of several thin ceramic layers that are stacked or laminated together. Where necessary, openings are cut into the layers to form the vias 70, 72, which are then filled with a conductive paste, such as silver or silver palladium. The electrodes 66, 68 are printed circuitry that is placed upon the surface of the layers 58 and 62 by screen printing. The green diamond tape 44 is shown in FIG. 3 to be stacked together with the ceramic tape 56 containing the capacitor 64. Although only a capacitor 64 is illustrated, it will be understood by those of skill in the art that other electronic circuit components may also be integrated into the ceramic tape, thereby permitting sensors, actuators, capacitors, or other similar electronic mechanisms to be integrated onto the surface of the downhole tool. Alternatively, circuitry may be printed directly onto the diamond tape 44 itself, as might be desirable for use in creating an erosion sensor. For protection of the capacitor 64, the diamond tape 44, in FIG. 3, is placed upon the outside of the ceramic tape 56 that has printed circuitry thereon. For applications wherein a significant heat sink is required for the circuitry, it is desirable to place a layer of diamond tape between the eprinted circuitry and the tool since the diamond material provides an excellent heat conductor and a good heat sink.

In practice, the diamond tape 44 and the ceramic tape 56 are stacked or laminated together while both are in their green form. Then they are applied to the uncoated tool surface or a metallic component of the tool 50. The thermal cycle described earlier may then be conducted in order to cure the diamond tape 44 and ceramic tape 56 onto the tool surface 50. As noted, there may be multiple layers of diamond tape 44 and/or ceramic tapes 56 containing electrical circuit components. These layers may be arranged as required for protection of the electrical circuit components and to provide an adequate heat sink for the components.

Figure 4:
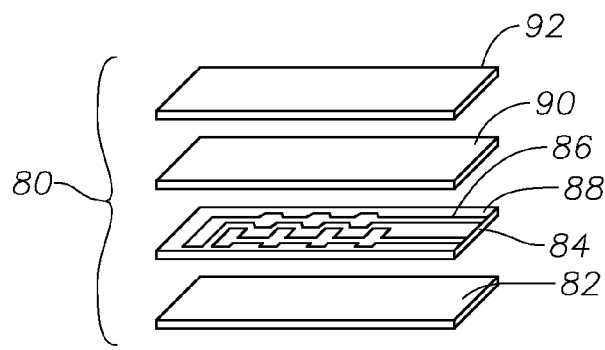
FIG. 4 illustrates an exemplary technique for stacking of diamond and ceramic tapes to form a sensor component.
Figure 5:
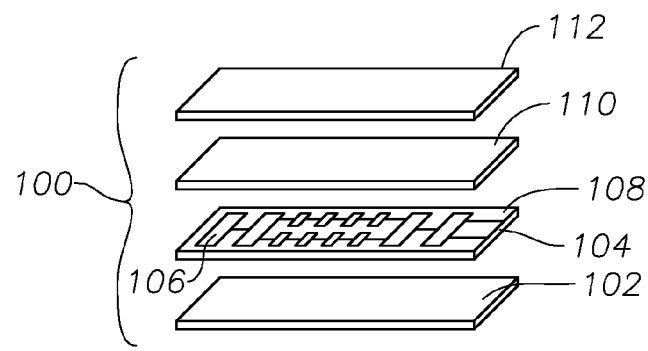
FIG. 5 depicts an exemplary technique for stacking of diamond and ceramic tapes to form an electronic component and to provide a heat sink for the electronic component.

FIGS. 4 and 5 illustrate two exemplary techniques for arranging layers of ceramic and diamond tapes in order to create electrical circuit components in a manner so that the circuitry is adequately protected. In FIG. 4, there is shown an exemplary stacked tape arrangement 80 for providing a protected sensor that may be applied directly to the surface of a downhole tool, which may be a bottom hole assembly or the surface of a measurement-while-drilling (MWD) or logging-while-drilling (LWD) device. The sensor may be used to detect temperature, pressure, or other downhole operating conditions. As the use of such sensors is well known in the art, their operation will not be described in detail here. Additionally, details relating to the interconnection of a downhole sensor to a processor, storage media or transmitter device, such as a mud pulser, are known in the art and, therefore, not described herein. The individual tape layers are depicted in FIGS. 4 and 5 as separated from one another. However, it will be understood that this is for clarity and that, in practice, these tape layers are placed in stacked contact with one another by laminating or layering.

The stacked tape arrangement 80 includes a ceramic base tape 82 that contains neither superhard particles nor printed circuitry. The base tape 82 is the layer that will lie adjacent to and contact the surface of the downhole tool. Ceramic tape 84 lies atop the base tape 82 and has printed circuitry 86 on its upper side 88 that forms a sensor of the type used to detect a downhole operating condition (i.e., pressure, temperature, and so forth). Ceramic cover tape 90 lies atop the tape 84, thereby encasing the printed circuitry 86 between two ceramic tapes 84 and 90. A protective diamond tape 92 lies atop the cover tape 90 and provides a superhard protective layer for the circuitry 86. Thus, the circuitry is afforded a protective layer against frictional forces within the borehole and other physical hazards that might damage the circuitry 86.

FIG. 5 illustrates an alternative stacked tape arrangement 100 that is optimized to provide both protection for the printed circuitry as well as an effective heat sink for the circuitry. The arrangement 100 is preferred if the electrical component(s) being formed by the printed circuitry is expected to run very hot during use. The arrangement 100 includes a diamond base tape 102 that will be placed into contact with the tool surface. A ceramic tape 104 having printed circuitry 106 upon its upper surface 108 overlies the diamond base tape 100. A ceramic cover tape 110 lies atop the ceramic tape 104, and a protective diamond tape 112 overlies the cover tape 110. In the arrangement 100, the presence of the diamond base tape 102 provides an effective heat sink for the electrical components 106, thereby permitting heat generated by the components 106 to be dissipated.

Diamond is an excellent thermal conductor and a very good heat sink. Additionally, the presence of the outer diamond layer 112 provides a protective barrier layer in the same manner as the diamond tape 92 described earlier. It is noted that in the two arrangements 80 and 100 described above, the electronic components 86, 106 are not placed directly into contact with a diamond tape layer but, rather, are protected from such contact by an intermediate layer of ceramic tape.

Those of skill in the art will recognize that numerous modifications and changes may be made to the exemplary designs and embodiments described herein and that the invention is limited only by the claims that follow and any equivalents thereof.

What is claimed is:

1. A method of forming a coating of superhard particles upon a substrate, the method comprising the steps of:
    placing an amount of powder of superhard particles into a liquid slurry;
    forming a green tape of said slurry;
    applying said green tape to a substrate;
    curing said green tape to form a coating upon the substrate, and further comprising the step of applying a ceramic tape having electrical circuit components to said substrate prior to applying said green tape to said substrate.

2. The method of claim 1 wherein the step of forming a green tape comprises tape casting the slurry to form the green tape.

3. The method of claim 1 wherein the step of applying said green tape to a substrate comprises:
    coating a portion of the tape with a braze to form a coated green tape; and
    affixing the coated green tape to a substrate.

4. The method of claim 3 wherein the braze comprises a metallic braze.

5. The method of claim 1 wherein the step of curing said green tape to form a coating comprises subjecting the green tape to a thermal cycle to heat the green tape.

6. The method of claim 1 wherein the superhard particles of the powder have a size that is approximately 5 μm.

7. The method of claim 1 wherein the slurry consists essentially of:
    between about 55% and about 67% superhard particles; and
    between about 33% and about 45% of material from the group consisting of water, organic solvent, organic binder, reactive bonding material, and rheological additives.

8. The method of claim 1 wherein the green tape has a thickness that is between approximately 0.2 mm and approximately 1.0 mm.

9. A method of forming a coating of superhard particles upon a substrate, the method comprising the steps of:
    placing an amount of powder of superhard particles into a liquid slurry;
    forming a green tape of said slurry;
    applying said green tape to a substrate;
    curing said green tape to form a coating upon the substrate, and further comprising the step of stacking a ceramic tape having electrical circuit components onto the green tape prior to applying the green tape to the substrate.

10. A tool comprising:
    a metal core presenting a surface that provides a coating substrate;
    a coating of superhard material deposited on the core, the coating having been formed by:
        placing an amount of powder of superhard particles into a liquid slurry;
        forming a green tape of said slurry;
        applying said green tape to the coating substrate;
        curing said green tape to form a coating upon the coating substrate; and
    a tape coating having an electrical circuit component integrated therein.

11. The tool of claim 10 wherein a portion of the component is printed upon the tape coating.

12. The tool of claim 10 wherein the tape coating comprises a plurality of ceramic layers.

* * * * *